United States Patent
Wesley et al.

(10) Patent No.: US 6,693,907 B1
(45) Date of Patent: Feb. 17, 2004

(54) METHOD AND SYSTEM FOR MEASURING RECEPTION CHARACTERISTICS IN A MULTICAST DATA DISTRIBUTION GROUP

(75) Inventors: Joseph S. Wesley, Quincy, MA (US); Dah Ming Chiu, Acton, MA (US); Miriam C. Kadansky, Westford, MA (US); Joseph E. Provino, Cambridge, MA (US); Stephen R. Hanna, Bedford, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/546,946

(22) Filed: Apr. 11, 2000

(51) Int. Cl.[7] ............................................... H04L 12/28
(52) U.S. Cl. ..................... 370/390; 370/400; 370/408
(58) Field of Search ................................ 370/252, 253, 370/256, 390, 394, 400, 408, 473

(56) References Cited

U.S. PATENT DOCUMENTS

| | | | | |
|---|---|---|---|---|
| 5,251,152 A | * | 10/1993 | Notess et al. ............... | 370/550 |
| 5,541,927 A | * | 7/1996 | Kristol et al. .............. | 370/94.2 |
| 6,031,818 A | * | 2/2000 | Lo et al. .................... | 370/216 |
| 6,188,674 B1 | * | 2/2001 | Chen et al. ................. | 370/252 |
| 6,526,022 B1 | * | 2/2003 | Chiu et al. .................. | 370/229 |
| 6,556,541 B1 | * | 4/2003 | Bare .......................... | 370/235 |

* cited by examiner

*Primary Examiner*—Chau Nguyen
*Assistant Examiner*—Christine Ng
(74) *Attorney, Agent, or Firm*—Weingarten, Schurgin, Gagnebin & Lebovici LLP

(57) ABSTRACT

A method and system for accurately measuring the reception characteristics of receivers in a multicast data distribution group having a sending node and a plurality of receivers. The multicast group is organized as a repair tree in which selected nodes of the multicast group comprise repair nodes for downstream receivers. Multicast data packets transmitted by the repair nodes include a retransmission count field in addition to the multicast packet header information, a session identifier, a packet sequence number and payload data. The retransmission count provides an indication of the number of times the respective packet has been retransmitted in response to a repair request. The receivers include an original packet counter and a retransmission count counter for each multicast session. Each receiver increments the original packet counter upon receipt of a packet that has not been previously received. Each receiver adds the value contained in the retransmission count field of a received packet to the retransmission count counter upon receipt of a retransmitted multicast packet that corresponds to a packet identified as a missing packet by the respective receiver. The data in the actual packet count counter and the retransmission count counter is employed to generate a loss metric at each receiver that provides a measure of the reception characteristic of the respective receiver for the particular multicast session.

24 Claims, 7 Drawing Sheets

| Sequence Number | TX-RPC |
|---|---|
| 1 | 0 |
| 2 | 0 |
| 3 | 0,1,2,3 |
| 4 | 0 |
| 5 | 0 |
| 6 | 0,1,2,3,4,5 |
| 7 | 0 |
| 8 | 0,1 |
| 9 | 0 |
| 10 | 0 |
| ⋮ | |
| 100 | 0 |

Fig. 6

| Sequence Number | Rcvd |
|---|---|
| 1 | Y |
| 2 | Y |
| 3 | N |
| 4 | Y |
| 5 | Y |
| 6 | N |
| 7 | Y |
| 8 | N |
| 9 | Y |
| 10 | Y |
| ⋮ | |
| 100 | Y |

Fig. 8

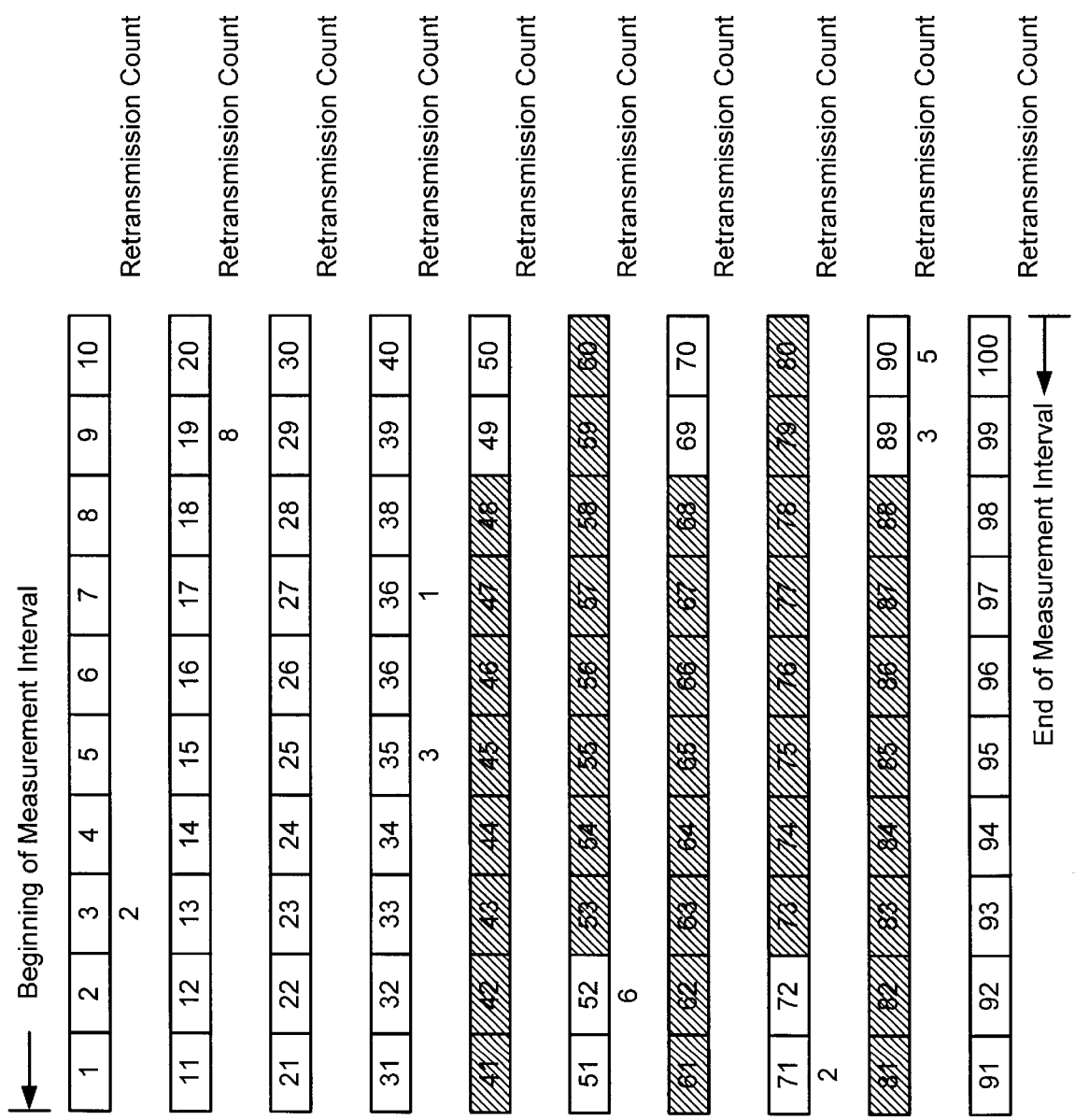

METHOD AND SYSTEM FOR MEASURING RECEPTION CHARACTERISTICS IN A MULTICAST DATA DISTRIBUTION GROUP

BACKGROUND OF THE INVENTION

The present invention relates to telecommunication networks and more particularly to a method and system for measuring the reception characteristics of receivers in a multicast data distribution group.

Multicast data transmission techniques are well known. In a multicast data distribution group, a sending node transmits a multicast message to a plurality of member nodes within the multicast group. The members of the group are typically organized in a hierarchical repair tree in which nodes at respective levels of the repair tree act as repair nodes or repair heads for receivers located at the next or lower levels of the repair tree. The multicast messages transmitted by the sending node typically include a session identifier and a sequence number. A receiver determines that it did not receive one or more packets within a multicast session if it receives a multicast packet that includes a sequence number that is higher than other packets in the multicast session sequence that were not received. In the event that a determination is made that one or more packets were not received at a receiver, a repair request may be issued to the respective repair node to initiate the retransmission of the missing packet(s). For purposes of reference herein, repair requests are considered as being transmitted upstream, or up the repair tree, and multicast data packets transmitted from the sending node or a repair head to a receiver which is at a lower level in the repair tree are considered as being transmitted downstream or down the repair tree.

In multicast data transmissions groups, reliability support mechanisms may be employed to attempt to assure that all member nodes of a multicast group receive the transmitted data and that multicast data transmissions proceeds at an acceptable data rate. Congestion control mechanisms are employed that result in the adjustment of the data transmission rate to a rate that can be accommodated by the multicast group receivers. The reduction of the transmission rate of the sending node to a rate that can be accommodated by all receivers fails, however, when the sending node must maintain a minimum data transmission rate which exceeds the rate at which one or more nodes in the multicast group can receive data. For this reason, multicast data distribution groups have employed techniques which result in the pruning of receivers from the multicast group in the event the receivers cannot receive multicast message at a minimum acceptable data transmission rate. One technique for pruning receivers in a multicast data distribution group is disclosed in U.S. patent application Ser. No. 09/497,443, titled Method and Apparatus for Hierarchical Discovery and Pruning of Slow Members of a Multicast Group, filed Feb. 3, 2000 and assigned to the assignee of the present application, and incorporated herein by reference.

Congestion control and pruning decisions are typically based upon the reception characteristics of the respective receivers within the multicast data distribution group. The accurate measurement of the data loss rate experienced by a receiver is recognized as a difficult problem. It would therefore be desirable to be able to provide a technique for accurately measuring the reception characteristics of receivers in a data distribution group so that congestion control and pruning operations can be based upon reliable information pertaining to the reception characteristics of the receivers in the multicast group.

BRIEF SUMMARY OF THE INVENTION

Consistent with the present invention, a method and system are disclosed for accurately measuring the data loss rate of receivers within a multicast data distribution group. The multicast group includes a sending node and a plurality of receiver nodes that are organized as a repair tree in which selected nodes of the multicast group serve as repair nodes for downstream receivers. The repair nodes retransmit packets in response to repair requests issued by downstream receivers upon a determination that one or more packets were not received. Each multicast data packet that is transmitted includes a retransmission count field in addition to the fields typically included in the multicast data packet. When a sending node transmits a multicast data packet for the first time, the retransmission count field is initialized to zero. Each repair node stores a retransmission counter value in a transmit retransmission counter (TX-RPC) associated with the packet sequence number for each received packet within the multicast session. The TX-RPC counter value comprises an indication of the number of times the respective packet has been retransmitted by the repair head in response to a repair request. When a repair head receives a request to retransmit a packet, the repair node increments the TX-RPC for the respective packet sequence number in the relevant multicast session and includes the retransmission count in the multicast data packet retransmission count field for the repair packet.

For each multicast session, in a preferred embodiment, each receiver maintains two counters for each multicast session which are used in the generation of a data loss metric. The counters are initialized to zero during the multicast session initialization and optionally at intervals within the respective multicast session. The first counter, referred to herein as the receiver original packet counter (RX-OPC), is employed to maintain a count of the original multicast data packets received at the respective receiver and is incremented upon receipt of each packet within the multicast session that is received for the first time; i.e. either from the sending node or via a retransmission from a repair head. Thus, each receiver increments the original packet counter upon receipt of a packet that has not been previously received. The second counter, referred to herein as the receiver retransmission packet counter (RX-RPC) is employed to maintain a count of the number of attempted retransmissions for retransmitted packets received by the respective receiver for which the receiver recognized the packet as missing at the time of receipt of the respective retransmitted packet. More specifically, when a data packet is received at the respective receiver that is not an original data packet, and the packet is listed as missing, the value contained in the retransmission count field is added to the then current value of the RX-RPC. A data loss metric generated as a function of the RX-OPC and the RX-RPC in each receiver provides an accurate indication of the reception characteristics of the receiver for the respective multicast session.

In one embodiment of the presently disclosed system, the data loss metric is generated over a predetermined number of packets which comprises a data loss measurement window. The width of the window may be programmably selected. In the event one or more packets have not been received within the measurement window, the RX-RPC may be incremented by the number of missing packets within the measurement window prior to calculating the data loss metric for the respective measurement window.

Other forms, features and aspects of the above described methods and system are described with particularity below.

BRIEF DESCRIPTION OF THE SEVERAL VIEWS OF THE DRAWING

The invention will be more fully understood by reference to the following Detailed Description of the Invention in conjunction with the drawing of which:

FIG. 6 is an example of a retransmission count table of the type depicted in FIG. 3;

FIG. 8 is an example of a missing packet table of the type depicted in FIG. 3; and FIG. 9 is a diagram illustrating received and missing packets within an exemplary measurement interval of a multicast session along with exemplary retransmission counter values for received packets.

DETAILED DESCRIPTION OF THE INVENTION

Figure 1:
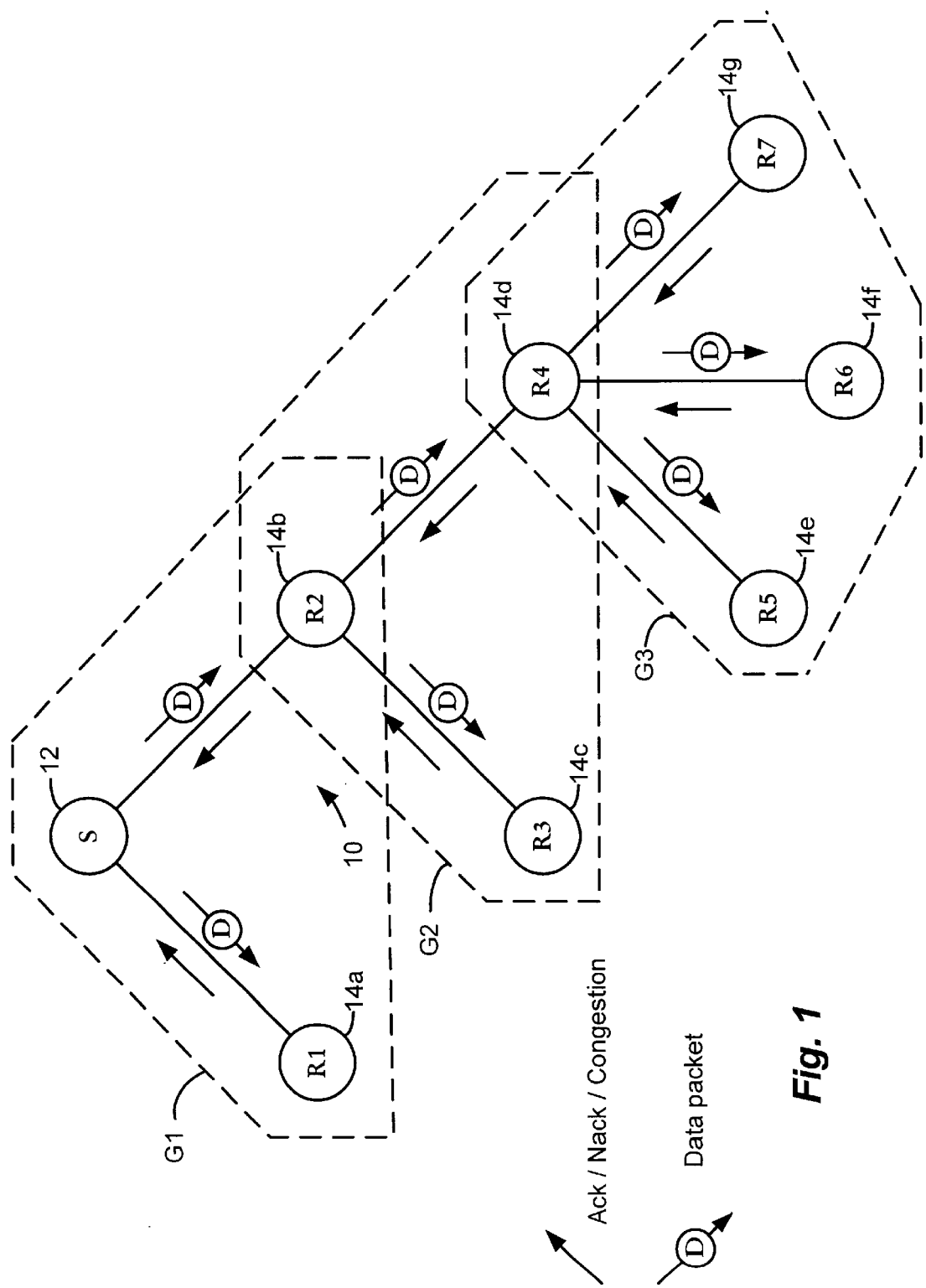
FIG. 1 is a block diagram of a multicast data distribution group operative in a manner consistent with the present invention.

A method and system for accurately measuring the reception characteristics of receivers in a multicast data distribution group and for generating a slowness metric representative of such characteristics is disclosed. Referring to FIG. 1, an exemplary multicast data distribution group is depicted which is operative in a manner consistent with the present invention. The multicast group 10 includes a sending node 12 and a plurality of receiver nodes 14, designated 14a through 14g respectively. The sending node 12 and receiver nodes 14 of the multicast group 10 are organized as a repair tree with the sending node 12 at the root of the tree. The sending node 12 and selected receiver nodes 14b, 14d comprise repair heads within the repair tree. More specifically, the sending node 12 serves as a repair node for receivers 14a and 14b within a repair group G1, the receiver 14b serves as a repair node for receivers 14c and 14d within a repair group G2 and receiver node 14d serves as a repair node for receivers 14e, 14f and 14g within a repair group G3.

The sending node 12 and receivers 14, may comprise a computer or processing element, a personal digital assistant (PDA), an intelligent networked appliance, a network node such as a router or network switch, a controller or any other device capable of performing the functions herein described. The sending node 12 preferably transmits multicast data packets for receipt by all of the members of the multicast group via a reliable multicast protocol. For example, the Pragmatic General Multicast (PGM) protocol, the Reliable Multicast Transport Protocol (RMTP) the Tree Based Reliable Multicast Protocol (TRAM) (See Chiu, Hurst, Kadansky, Wesley, "TRAM: A Tree-based Reliable Multicast Protocol", Sun Labs Technical Report, TR-98-66, July 1998 at http://www.sun.com/research/techrep/1998) or any other suitable multicast protocol may be employed. The data packets may be delivered to the various group members via the repair heads as illustrated in FIG. 1, or alternatively, delivered to the group members via other nodes (not shown). For purposes of simplicity of explanation, it is assumed herein that data packet delivery proceeds downward through the repair tree as depicted in FIG. 1. The reliable multicast protocol is preferably employed in an effort to assure delivery of data packets to all group members.

The receivers 14 regularly send acknowledgements (ACKs) or negative acknowledgements (NACKs) to their respective repair heads to report the progress of data reception. Additionally, if the current rate of multicast transmission is too fast, a receiver 14 transmits a congestion packet upstream to the respective repair head as applicable. Congestion packets received at a receiver node 14 from a downstream receiver node are generally forwarded upstream to the applicable repair head. The congestion packet may provide an indication that the congested node has correctly received fewer packets within a specified multicast session interval than had been received in the immediately prior session interval. Alternatively, the congestion packet may be indicative of any other suitable measure of congestion. Upon receiving an indication of congestion, the receiver node 14 forwards the congestion packet upstream. Duplicate indications of congestion may be suppressed by a repair head that receives from a downstream node the duplicated indication of congestion within a congestion evaluation window. Based upon the aggregated congestion information, the sending node may adjust the data transmission rate.

The multicast group 10 is typically assigned a minimum acceptable data transmission rate and a maximum acceptable data transmission rate as administrative functions when the multicast group is established. The minimum acceptable data transmission rate is typically selected as the lowest data transmission rate required to satisfy the operational objectives for the respective multicast session. The maximum acceptable data rate is selected based upon the amount of network bandwidth that will be made available to the respective multicast session. When the transmission of data packets within the multicast group 10 commences, an initial transmission rate is typically selected which is between the minimum and the maximum acceptable data transmission rates. If a receiver 14 becomes congested, it generates and forwards a congestion packet upstream to its repair head as described above and the sending node 12 eventually receives an indication of the congestion condition from one of its children within the repair tree. In response to the receipt of a congestion packet at the sending node 12, the sending node 12 reduces the data transmission rate. If congestion packets continue to be received at the sending node 12, the sending node 12 may decrease the data transmission rate until it reaches the minimum acceptable data transmission rate for the multicast group. If the sending node reduces the data transmission rate to the minimum acceptable data transmission rate and receives an indication of congestion via a congestion packet, the sending node may elect to initiate pruning of slow receiver nodes 14 within the multicast group. Since removal or pruning of receivers from a multicast group is generally undesirable, it is important that the decision to prune a member be based upon an accurate determination of the reception characteristics of the respective receiver.

Figure 2:
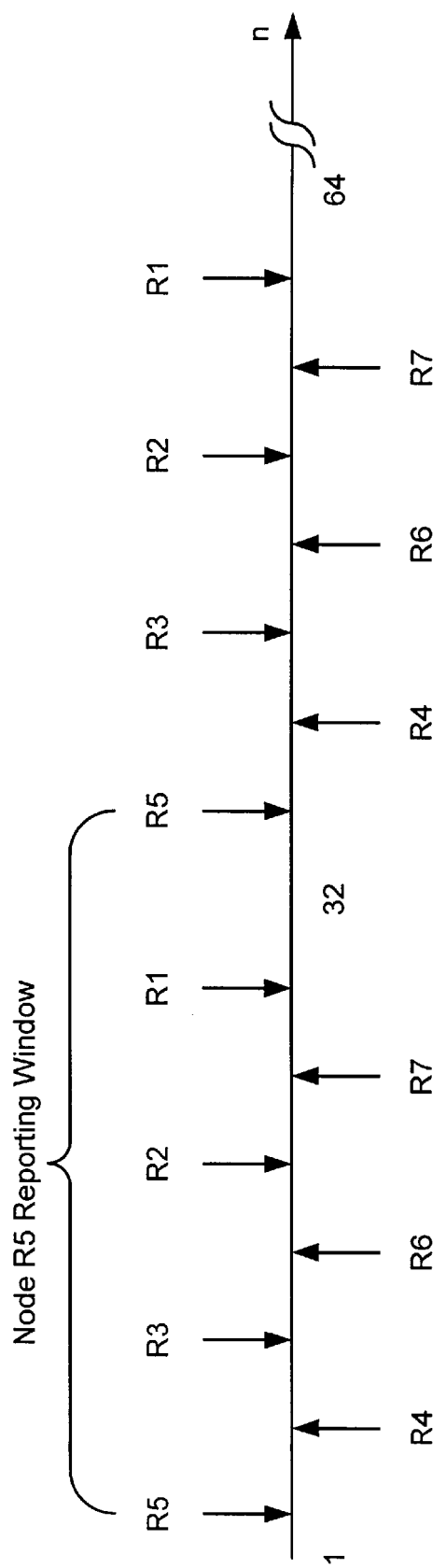
FIG. 2 is a timing diagram depicting exemplary timing of ACK/NACK messages in the multicast data distribution group of FIG. 1.

FIG. 2 depicts exemplary timing of flow control messages which comprise Acknowledgement (ACK) messages and Negative Acknowledgement (NACK) messages that are transmitted upstream by the respective receiver nodes 14 to their respective repair heads depicted in FIG. 1. The X axis in FIG. 2 corresponds to increasing message sequence numbers within a given multicast session from 1 to n and the vertical arrows illustrate when respective nodes within the multicast group are intended to transmit their respective ACK/NACK messages. For purposes of reference, the location of sequence numbers 1, 32 and 64 are shown in FIG. 2 along the X axis. As depicted in FIG. 2, the timing of transmission of the ACK/NACK messages are preferably staggered in time to avoid receipt of numerous ACK/NACK messages at the same time at any one receiver node 14 or at the sending node 12. For example, receiver R5 may transmit its initial ACK/NACK message within the respective multicast session upon detection of the transmission of the fourth multicast message within a multicast session. The receiver R5 could transmit its subsequent ACK/NACK message a specified number of messages following the initial ACK/NACK message transmission. The period between flow control messages typically transmitted by any one receiver node 14 in the multicast group is referred to as a reporting window. A reporting window for node R5 is depicted in FIG. 2 for purposes of illustration. In the illustration depicted in FIG. 2, each receiver node 14 typically generates a flow control message following receipt of every 32 multicast data packets within a multicast session as determined by message sequence numbers within the respective multicast data packets. While the illustrative reporting window depicted in FIG. 2 comprises a 32 message wide window, the width of the reporting window may vary based upon design objectives. In the presently illustrated example R5 would transmit a subsequent ACK/NACK message upon detection of the thirty-sixth data packet within the respective multicast session. If a data packet having a sequence number greater than the thirty-sixth data packet is received before the thirty-sixth data packet, the ACK/NACK message is transmitted by the respective node upon detection of the greater sequence number. The ordering of ACK/NACK messages transmitted by receivers 14 in FIG. 2 is arbitrary and is shown to illustrate the nature of ACK/NACK message reporting within the multicast group.

As known in the art, the ACK message indicates that the respective receiver nodes 14 received all intervening messages. The NACK message indicates that all packets expected to be received were not received within the reporting interval up through a particular message sequence number. A bit mask is provided with the NACK message which includes an identification of missing packets. The NACK messages comprise repair requests to the respective repair heads to retransmit packets identified as missing. The retransmissions may proceed in response to the NACK messages or be suppressed in accordance with repair message suppression techniques known in the art.

Figure 3:
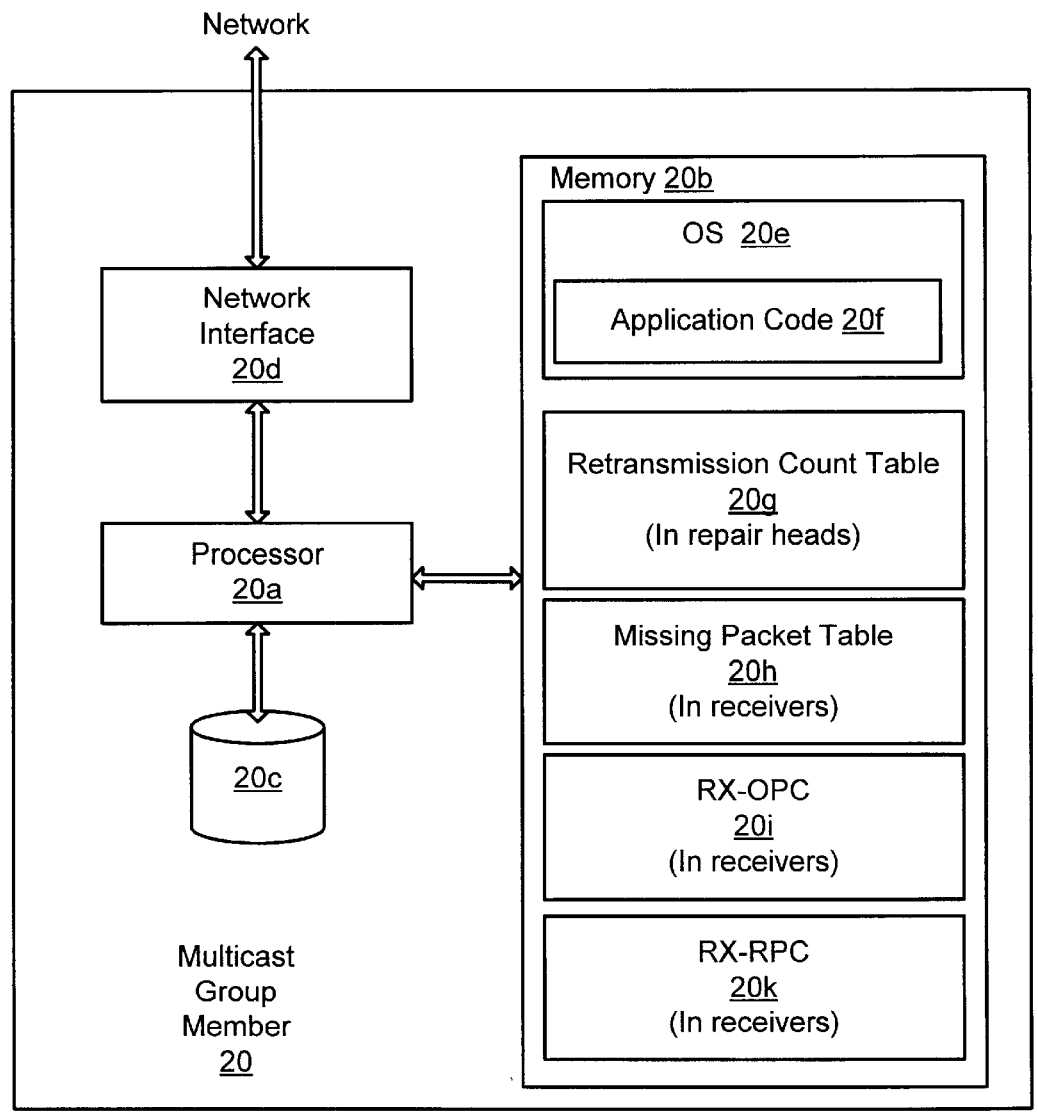
FIG. 3 is a block diagram depicting exemplary members of the multicast data distribution group of FIG. 1.

FIG. 3 illustrates a block diagram of an exemplary member of the multicast data distribution group of FIG. 1. The block diagram is intended to illustrate both the repair head and the receiver functionality which may vary depending upon whether the member comprises a sending node 12 which possesses repair head functionality, a non-sending node repair head, or a receiver 14 which does not possess repair head functionality. Referring to FIG. 3, the multicast group members generally referred to as 20 include a processor 20a which is operative to execute programs out of an instruction/data memory 20b. The memory 20b typically contains an operating system 20e and application code 20f which is invoked by the operating system 20e. The application code 20f will vary depending upon whether the respective group member 20 is a sending node 12, a repair head 14b, 14d, or a receiver 14 that is not a repair head. The respective multicast group member 20 is coupled to a network via a network interface 20d. The network is depicted logically in FIG. 1 for the respective multicast group members in terms of the communication paths for the respective members of the multicast group. The network may comprise as a local Area Network (LAN), a Wide Area Network (WAN), the Internet, or any other network suitable for multicasting of data packets from a sending node to other multicast group members. The nodes may optionally include secondary storage 20c for storing programs operative to perform the functions described for the respective multicast group members.

Each repair head maintains a retransmission count table 20g within the memory 20b. The table maintains a record of each sequence number within the respective multicast session along with a retransmission counter (the TX-RPC counter) for each respective sequence number. Each retransmission counter maintains a count of the number of times the particular packet has been retransmitted by the repair head. Each receiver 14 maintains a missing packet table 20h which is employed to identify the packet sequence numbers within a multicast session that are deemed to be missing by the respective receiver 14. A repair request may be initiated in the form of a NACK message as described above to request that the missing packets be retransmitted by the repair head for the respective receiver. A packet of a specified sequence number is deemed to be missing within a reporting interval if it has not been received and a packet having a higher sequence number has been received.

Receivers 14 include a receiver original packet counter (RX-OPC) 20i and a receiver retransmission packet counter 20k for each multicast session. The function and operation of these counters are described in detail below.

Figure 4:
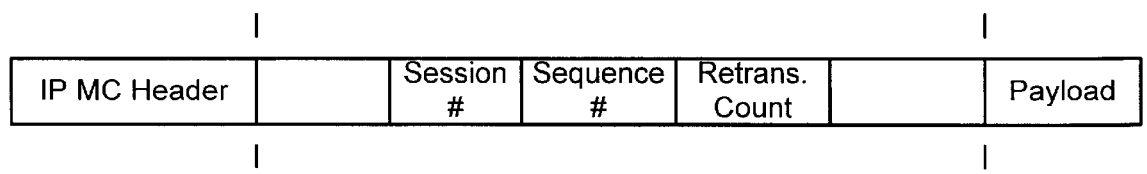
FIG. 4 is an illustrative data structure of a multicast data packet that includes a retransmission count field.

As depicted in FIG. 4, the multicast data packets include a retransmission count field which facilitates the maintenance of accurate reception characteristics at the respective receivers 14. In a preferred embodiment, the multicast data packets comprise Internet Protocol (IP) multicast packets and include an Internet Protocol (IP) multicast header as known in the art, a session number that serves to identify the multicast session, a sequence number that serves to identify the particular packet within the respective multicast session, the retransmission count field and a payload.

Figure 5:
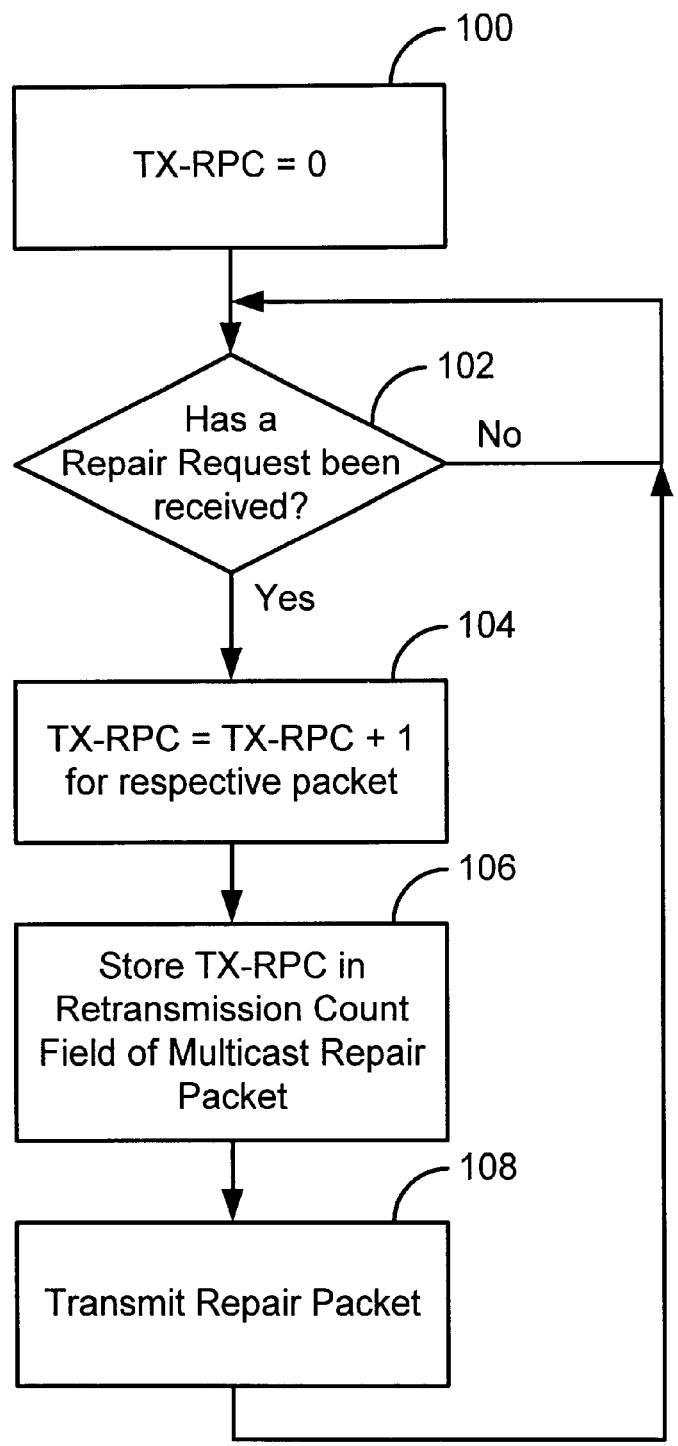
FIG. 5 is a flow diagram illustrating a method for maintaining a record of retransmissions of multicast packets at repair heads of the exemplary multicast data distribution group of FIG. 1.

The method of operation at a repair head will be apparent by reference to the flow diagram of FIG. 5 along with an exemplary retransmission count table 20g which is depicted in FIG. 6. It is assumed for ease of explanation that session filtering is performed in advance of the presently described process. Accordingly, all of the packets are considered to be part of a single multicast session.

When multicast packets are initially transmitted by the sending node 12 to the multicast group members, the sending node 12 initializes the retransmission count field to zero. Assuming that the sending node 12 transmits a multicast session comprising 100 packets, the retransmission count field in each of the packets is thus initialized to zero upon transmission. As the packets are received in the respective repair heads, such as repair head 14b within repair group G2 (See FIG. 1), the repair head creates a table that includes the sequence number for the respective multicast session along with the received retransmission count field. The retransmission count field is stored in the respective transmit retransmission packet counter (TX-RPC) associated with the particular packet sequence number. A similar table is maintained at the sending node 12 upon transmission of the respective packets since the sending node 12 comprises a repair head for the repair group G1.

Thus, the retransmission count table 20g will appear generally as depicted in FIG. 6 with the TX-RPC initially equal to zero. It is recognized that the data packets will be received over time at the repair head and repair requests may be received at a repair head before all of the session data packets have been received. As time progresses, the repair head R2 will receive repair requests pertaining to specific packets that were not received or incorrectly received at a node within the particular repair group G2. In the present example, such repair requests would come from nodes R3 or R4. In response to a repair request received at the repair head R2, the repair head R2 retransmits the requested packet.

Referring to FIG. 5 and as depicted in step 100, the TX-RPC counters are initialized to zero as a consequence of the transmission of the original packet with a zero value in the retransmission count field of the IP multicast packet. The repair head R2 awaits receipt of a repair request as depicted in step 102. In the event that a repair request is received, such as a request from node R3, for retransmission of packet sequence number 3, as illustrated in step 104, the transmit retransmission packet counter (TX-RPC) is incremented. As illustrated in step 106 the value of the TX-RPC is stored within the retransmission count field of the repair packet corresponding to third packet in the multicast session and, as shown in step 108 the repair packet is retransmitted to the members of the repair group G2. This process is repeated in response to each request for repair received at the respective repair head subject to suppression of retransmissions in accordance with known suppression techniques. Thus, as illustrated in FIG. 6, the TX-RPC for a particular packet sequence number will be incremented each time the respective packet is retransmitted by a repair head in response to a repair request. FIG. 6 therefore depicts the circumstance in which the repair head R2 has retransmitted the third packet in the multicast session three times, has retransmitted the sixth packet in the multicast session five times and has retransmitted the eighth packet within the multicast session once. It is noted that the series of counter values in the table are intended to reflect the value of the respective TX-RPC counter over time.

Figure 7:
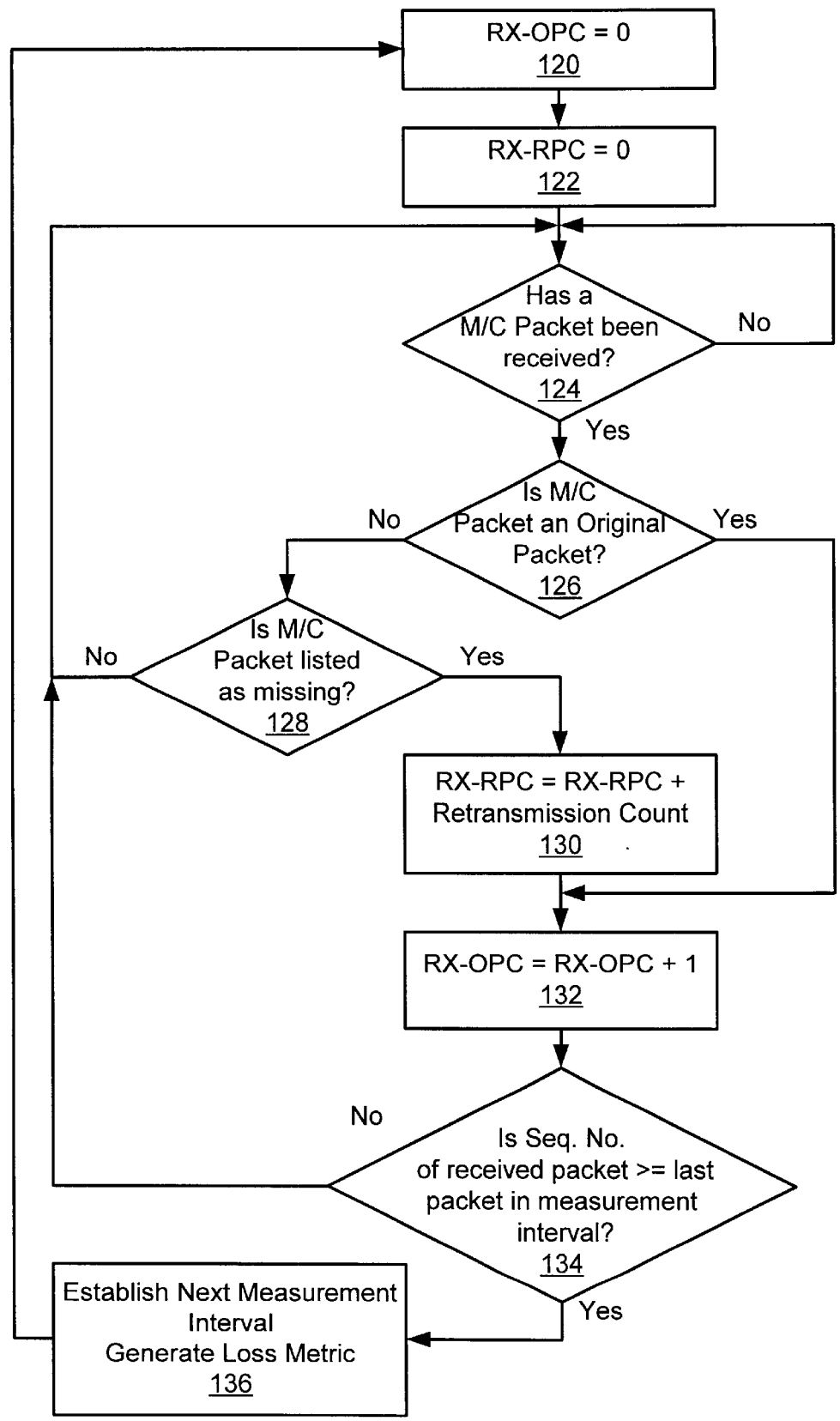
FIG. 7 is flow diagram illustrating an exemplary method of operation at a receiver for determining the number of originally received data units along with the number of retransmitted data units within a multicast session.

FIG. 7 illustrates the operation of the receivers 14 within the multicast group 10. As indicated above, for each multicast session, each receiver maintains two counters, the receiver original packet counter (RX-OPC) counter and the receiver retransmitted packet counter (RX-RPC) counter. The RX-OPC counter is employed to maintain a count of each packet received within the multicast session for the first time; i.e. either as the result of a transmission from the sending node or as the result of a retransmission from the respective repair head. Each receiver also maintains a missing packet table 20h that is employed to identify packets within a multicast session that were expected to have been received but were not received. An exemplary missing packet table is depicted in FIG. 8. In the event a packet is received at a receiver that includes a sequence number greater than other packet sequence numbers that have not been received, the packets bearing the sequence numbers that were not received are identified as missing. As illustrated in the illustrative missing packet table of FIG. 8, assuming packet 4 is received before packet 3, packet 3 is marked as missing. Similarly, if packet 7 is received before packet 6, packet 6 is identified as missing. Finally, as illustrated in FIG. 8, if packet 10 is received before packet 9, packet 9 is marked as missing. Preferably, the marking of packets as missing is performed at the culmination of each reporting intervals to avoid remarking of packets if a packet marked as missing is subsequently received during the reporting interval. Repair requests, as discussed above, in the form of NACK messages, may be issued at the end of each such reporting interval, which is a 32 packet reporting interval in the embodiment illustrated in FIG. 1.

Referring to FIG. 7, at the initiation of each multicast session, or at the beginning of a new measurement interval (which is discussed further below), the RX-OPC and the RX-RPC are initialized to zero as depicted in steps 120 and 122. The respective receiver 14 awaits receipt of a multicast packet as depicted in inquiry step 124. In the event a multicast packet has been received, control passes to inquiry step 126. In step 126 inquiry is made whether the received packet is an original packet. The received packet is deemed to be an original packet if it includes a sequence number within the respective multicast session that has not been previously received and it includes a sequence number that is higher than any previously received sequence number (or alternatively, is not a retransmitted packet and is not listed as missing). In the event the packet is an original multicast packet, the receiver original packet counter RX-OPC (See FIG. 3, 20i) is incremented as depicted in step 132 and control passes to inquiry step 134. In step 134 a determination is made whether the received packet is within a pre-defined measurement interval (e.g. 100 packets in width in a preferred embodiment). If the received packet sequence number is not greater than or equal to the last sequence number within the measurement interval, control passes to step 124 to await receipt of another multicast packet. If the sequence number of the received packed is greater than or equal to the last packet sequence number in the measurement interval, the next measurement interval is established and the loss metric for the respective interval is generated as depicted in step 136. Control then passes to steps 120 and 122 wherein the RX-OPC and the RX-RPC counters are reinitialized.

If it is determined in step 126 that the received packet is not an original multicast packet, a determination is made whether the packet is listed as missing, as depicted in step 128. In the event the packet is listed as missing, the value of the retransmission count field in the respective packet is added to the receiver retransmission packet counter (RX-RPC) (See FIG. 3, 20k) as depicted in step 130. Since the value of the retransmission packet counter contains the number of retransmissions of the respective packet, the addition of the contents of the retransmission count field to the receiver retransmission counter yields the total number of retransmitted packets for the respective session (or session interval as discussed below). As indicated in step 132 the RX-OPC counter is incremented and control passes to step 134. In inquiry step 134, a determination is made whether the received packet includes a sequence number which is greater than or equal to the last sequence number within the respective interval as discussed above.

If in step 128, it is determined that the received packet is not a missing packet, control passes to step 124 to await receipt of another packet since if the received packet is not a missing packet (and not an originally received packet) such indicates that the packet was previously properly received by the respective receiver. Accordingly, neither the receiver original packet counter nor the receiver retransmission packet counter are incremented.

A metric indicative of the reception characteristics of the respective receiver can be generated by dividing the RX-RPC count value by the RX-OPC value; that is the experienced loss at a receiver equals RX-RPC/RX-OPC at any given time. This loss metric serves as an indication of the slowness of the receiver or more specifically, a measure of the ability of the respective receiver to receive data packets at the then current data rate for the respective session; i.e. the higher the value of the metric, the less able the receiver to receive multicast packets at the then existing data rate and line conditions.

For long running sessions which extend in length greater than a predetermined number of packets in length, the multicast session may be subdivided into a plurality of loss measurement intervals which extend in length for a predetermined number of packets, e.g. 100 packets in length. The metric may be calculated over the respective packet interval. By recalculating the slowness metric at predetermined measurement intervals, the metric can be used to more readily determine the current reception characteristics of the receiver. In the event that the reception metric is being recalculated at specified packet intervals, the RX-OPC and the RX-RPC are reinitialized to zero at the commencement of each interval. The slowness metric may be employed in the determination of whether the respective node should be pruned from the multicast group in accordance with the technique described in U.S. patent application Ser. No. 09/497,443 or in any other pruning technique that relies upon a slowness metric indicative of the reception characteristics of the receiver in the pruning determination.

Additionally, if the sending node is operating at the minimum acceptable data transmission rate, the slowness metrics may be used by the sending node to isolate the subset of receivers that are to be pruned.

Moreover, a slowness metric generated in the presently described manner may be employed as an congestion indicator and employed in determining whether the sending node 12 data rate should be adjusted and the extent of the rate adjustment. For example, based upon the value of the slowness metric, the sending node transmission data rate may be reduced by a value greater than or less than a reduction rate reduction typically employed. More specifically, one or more thresholds may be applied against the slowness metric and the rate of reduction in the sending node data transmission rate may be established based upon the value of the slowness metric with respect to the threshold (s). As an example, if the slowness metric for a particular receiver is above a first slowness metric threshold and below a second slowness metric threshold, the data transmission rate of the sending node may be reduced by 20% and if the slowness metric for a particular receiver is above the second slowness metric threshold, the sending node may reduce the data transmission rate by 50%. Such rates are intended by way of illustration and it is recognized that the specific reduction rates and threshold values may be varied in different applications.

Historical records of the value of the slowness metrics may be maintained and such records may be employed to determine whether the reception characteristics of a receiver have been improving or deteriorating over time.

It should be appreciated that at the end of a measurement interval, some packets may still not have been received. For example, assuming that a measurement interval of 100 packets is employed, as illustrated in FIG. 9, it is possible that not all packets will have been received within the 100 packet measurement interval. In FIG. 9, the shaded packets are indicative of packets that were not received within the respective interval and the non-shaded packets represent packets that were received by the respective receiver. For example referring to FIG. 9, it is assumed that the receiver R3 received the non-shaded packets and that the retransmission counts indicated below selected ones of the non-shaded packets correspond to the value of the retransmission count field contained within the packet when received at the node R3. As indicated in the example depicted in FIG. 9, 60 packets were received within the 100 packet measurement interval. Eight of the 60 packets contained retransmission counts that total 30 retransmissions. Forty packets are missing. The experienced loss metric may be calculated as follows:

Experienced loss=[(RX-RPC)+(Number of packets listed as missing within the measurement interval)]/(number of packets in the measurement interval)

Experienced loss=[(30)+(40)]/100=0.7

This calculation assumes that each of the missing packets would have included a retransmission count equal to Alternatively, a loss ratio for the measurement interval may be determined based upon historical data obtained during the pertinent measurement interval. For example, assuming that that 60 packets were received within the 100 packet measurement interval as illustrated in FIG. 9, at the end of the measurement window the RX-OPC value equals 60 (indicating that 60 packets were received). Additionally, the RX-RPC value equals 30. This indicates that on average, 0.5 packets were retransmitted for each packet received. Accordingly, the experienced loss metric may be extrapolated based upon the data actually experienced as follows:

Experienced loss=[(RX-RPC)/(RX-OPC)]

Experienced loss=[30/60]=0.50

The experienced loss metrics generated as described above represent a relatively accurate measure of the ability of a receiver in a multicast group to receive packets under the then current network operating conditions. The loss metric may be compared against a threshold value and the receiver that generated the metric may be pruned from the multicast group in the event the loss metric exceeds a predtermined value. The loss metric may be employed in pruning and congestion algorithms that execute on a repair node if the loss ratios are propagated from the children of the repair node to the respective repair head. Additionally, the loss metric may be employed in congestion and pruning algorithms that execute within the respective receivers 14 that generated the metrics. Finally, the loss metric may be employed within pruning and congestion algorithms that execute at the sending node 12 of a multicast session provided that the repair nodes aggregate and propagate the loss information received from their respective receivers.

It should further be appreciated that a loss metric equal to the value of the original packet counter (RX-OPC) divided by the retransmission packet counter (RX-RPC) may be employed. In this circumstance, the respective receiver is pruned in the event the loss metric is below a predetermined threshold value.

While the loss rate in the above-described embodiment is discussed in terms of the number of retransmitted packets and the number of originally received packets, it should be appreciated that the respective counters may be controlled such that the number of bytes contained in retransmitted packets and the number of bytes contained in the originally received packets are monitored. In such event, the loss metric may be generated based upon the numbers of bytes indicated in the respective counters following a predefined measurement interval. Accordingly, the presently described technique for generating a loss metric may be employed irrespective of whether the data units being counted comprise packets or bytes.

While certain of the illustrative discussion presented herein are directed to a specific repair group, it should be appreciated that the techniques herein described are applicable to all repair groups within the multicast data distribution group.

Those skilled in the art should readily appreciate that computer programs operative to perform the functions herein described can be delivered to the sending node, the receivers and the repair nodes, in many forms; including, but not limited to: (a) information permanently stored in a non-writable storage media (e.g. read-only memory devices within a computer such as ROM or CD-ROM disks readable by a computer I/O attachment; (b) information alterably stored on writable storage media (e.g. floppy disks, tapes, read/write optical media and hard drives); or (c) information conveyed to a computer through a communication media, for example, using baseband or broadband signaling techniques, such as over computer or telephone networks via a modem. In addition, it should be appreciated that the presently described methods may be implemented in software executing out of a memory on respective multicast data distribution group nodes. Alternatively, the presently described functions may be embodied in whole or in part using hardware components such as Application Specific Integrated Circuits (ASICs), state machines, programmed logic devices, controllers or other hardware components or devices, or a combination of hardware components and software processes without departing from the inventive concepts herein described.

Those of ordinary skill in the art should further appreciate that variations to and modifications of the above-described methods and systems for measuring the reception characteristics of a receiver in a multicast data distribution group may be made without departing from the inventive concepts disclosed herein. Accordingly, the invention should be viewed as limited solely by the scope and spirit of the appended claims.

What is claimed is:

1. A method of operation at a receiver in a multicast data distribution group, said method comprising:

receiving at said receiver a plurality of multicast data packets of a multicast session, wherein each one of said packets includes a retransmission count within a retransmission count field, said retransmission count being indicative of the number of times the respective packet has been retransmitted;

in response to receipt of each one of said plurality of multicast data packets adding to a retransmission counter said retransmission count contained within the respective retransmission count field to produce a retransmission counter value in the event the respective received packet is a retransmitted packet and the respective received packet is identified within the receiver as a missing packet; and generating a loss value indicative of a reception characteristic of said receiver as a function of said retransmission counter value.

2. The method of claim 1 wherein said method further includes the step of incrementing an original packet counter to produce an original packet counter value in response to receipt of each received packet that is first received as a result of a packet transmission from a sending node or as a result of a packet retransmission from a repair head and wherein said generating step comprises the step of generating said loss value as a function of said retransmission counter value and said original packet counter value.

3. The method of claim 2 wherein said step of generating said loss value comprises the step of dividing said retransmission counter value by said original packet counter value.

4. The method of claim 2 wherein said step of generating said loss value comprises the step of adding to said retransmission counter value a value corresponding to the number of missing packets within a predetermined loss measurement interval to obtain a loss numerator, and dividing said loss numerator by a predetermined number equal to a number of packets comprising said predetermined loss measurement interval.

5. The method of claim 1 further comprising the step of dissociating said receiver from said multicast data distribution group in the event said loss value exceeds a specified threshold value.

6. The method of claim 1 further comprising the step of transmitting from said receiver a message indicative of congestion at said receiver in the event said loss value exceeds a specified threshold value.

7. Apparatus for generating a value indicative of the data loss rate of a receiver in a multicast data distribution group, said apparatus comprising:

receive logic for receiving a plurality of data packets of a multicast session, wherein each one of said packets includes a retransmission count value within a retransmission count field, said retransmission count value being indicative of the number of times the respective packet has been retransmitted;

first counter control logic for incrementing a first counter in response to receipt of each one of said plurality of data packets that is an originally received data packet;

said first counter control logic further operative to increment said first counter in response to receipt of each one of said plurality of data packets that is a retransmitted packet and identified as a missing packet;

second counter control logic, said second counter control logic operative in response to receipt of each one of said plurality of received packets that is a retransmitted packet and identified as a missing packet for adding to a second counter the retransmission count value contained within the respective retransmission count field; and a loss value generator, said loss value generator operative to generate a loss value indicative of a reception characteristic of said receiver as a function said first and second counters.

8. A method for generating a loss value in receivers of a multicast data distribution group, said method comprising:

maintaining at a repair head within said data distribution group, a table containing an identification of a plurality of multicast packets within a multicast session and an associated retransmission count value indicative of the number of times the respective packet identified within said table has been retransmitted by said repair head;

receiving at said repair head a plurality of requests to retransmit specified ones of said multicast packets identified within said table;

in response to receipt at said repair head of each of said plurality of requests to retransmit said specified multicast packets, incrementing the respective retransmission count value, inserting the incremented retransmission count value associated with the respective specified packet into the respective specified packet and transmitting said specified packet for receipt by receivers of a repair group within said multicast data distribution group;

in response to receipt of at least some of said multicast packets at each one of said receivers of said repair group, adding to a value contained in a retransmission counter said retransmission count contained within the respective received packet to generate a first value in the event the respective received packet is a retransmitted packet and the packet is identified within the respective receiver as a missing packet; and generating a loss value indicative of a reception characteristic of said respective receiver, wherein said loss value is a function of said first value.

9. The method of claim 8 further including the step of:

transmitting a plurality of original multicast data packets from a sending node within said multicast data distribution group for receipt by said receivers of said multicast data distribution group; and in a first incrementing step, incrementing a value contained in an original packet counter at one of said receivers to generate a second value in the event the respective received packet at said one of said receivers is an originally received packet; and in a second incrementing step, incrementing said second value contained in said original packet counter in the event the respective received packet is a retransmitted packet and the packet is identified within the receiver as a missing packet.

10. The method of claim 9 wherein said first incrementing step further includes the step of determining the respective received packet to be an originally received packet in the event said retransmission count field within the respective packet contains a predetermined value.

11. The method of claim 10 wherein said predetermined value equals zero.

12. The method of claim 9 wherein each of said plurality of receivers maintains an identification of received and missing packets and said first incrementing step further includes the step of determining the respective received packet to be an originally received packet in the event said respective received packet is not identified as one of said received or missing packets.

13. The method of claim 9 wherein said generating step comprises the step of generating said loss value as a function of said first and second values.

14. The method of claim 12 wherein said generating step comprises the step of dividing said first value by said second value.

15. The method of claim 12 wherein said generating step includes the step of adding a number corresponding to the number of packets identified as missing packets to said first value to provide an estimated retransmission count and dividing said estimated retransmission count by a predetermined number associated with the number of packets within a predetermined measurement interval.

16. A system for generating a loss value in receivers of a multicast data distribution group, said system comprising:

a repair head within said data distribution group, said repair head operative to maintain a table containing an identification of a plurality of multicast packets within a multicast session and an associated retransmission count value indicative of the number of times the respective packet identified within said table has been retransmitted by said repair head;

a repair group including said repair head and a plurality of receivers, said repair head being operative to receive repair requests from said receivers within said repair group and, in response to said requests, said repair head operative to increment the respective retransmission count value associated with the at least one selected packet, to insert the incremented retransmission count value associated with the at least one selected packet into each of the respective at least one selected packet and to the respective at least one selected packet for receipt by said plurality of receivers within said repair group;

said at least one of said plurality of receivers of said repair group being operative in response to receipt of said multicast packets from said repair head to add to a value contained in a retransmission counter said retransmission count contained within the respective received packet to generate a retransmission counter value in the event the respective received packet is a retransmitted packet and the packet is identified within the respective receiver as a missing packet, and to generate a loss value indicative of a reception characteristic of said at least one of said other receivers as a function of said retransmission counter value.

17. A computer program product including a computer readable medium, said computer readable medium having a computer program stored thereon, said computer program for execution in a processor within a receiver of a multicast data distribution group and for use in generating a loss value indicative of the ability of the receiver to receive multicast data packets, said computer program comprising:

program code for receiving a plurality of data packets of a multicast session, wherein each one of said packets includes a retransmission count value within a retransmission count field, said retransmission count value being indicative of the number of times the respective packet has been retransmitted;

program code for incrementing a first counter in response to receipt of each one of said plurality of data packets that is an originally received data packet; and program code for incrementing said first counter in response to receipt of each one of said plurality of data packets that is a retransmitted packet and identified as a missing packet;

program code responsive to receipt of each one of said plurality of received packets that is a retransmitted packet and identified as a missing packet for adding to a second counter said retransmission count value contained within the respective retransmission count field; and program code generating a loss value indicative of a reception characteristic of said receiver as a function said first and second counters.

18. A computer data signal, said computer data signal including a computer program for execution in a processor within a receiver of a multicast data distribution group, said computer program operative to generate a loss value indicative of the ability of the receiver to receive multicast data packets, said computer program comprising:

program code for receiving a plurality of data packets of a multicast session, wherein each one of said packets includes a retransmission count value within a retransmission count field, said retransmission count value being indicative of the number of times the respective packet has been retransmitted;

program code for incrementing a first counter in response to receipt of each one of said plurality of data packets that is an originally received data packet; and program code for incrementing said first counter in response to receipt of each one of said plurality of data packets that is a retransmitted packet and identified as a missing packet;

program code responsive to receipt of each one of said plurality of received packets that is a retransmitted packet and identified as a missing packet for adding to a second counter said retransmission count value contained within the respective retransmission count field; and program code generating a loss value indicative of a reception characteristic of said receiver as a function said first and second counters.

19. Apparatus for generating a loss value indicative of the ability of the receiver within a multicast data distribution group to receive multicast data packets, said apparatus comprising:

means for receiving a plurality of data packets of a multicast session, wherein each one of said packets includes a retransmission count value within a retransmission count field, said retransmission count value being indicative of the number of times the respective packet has been retransmitted;

means for incrementing a first counter in response to receipt of each one of said plurality of data packets that is an originally received data packet; and means for incrementing said first counter in response to receipt of each one of said plurality of data packets that is a retransmitted packet and identified as a missing packet;

means responsive to receipt of each one of said plurality of received packets that is a retransmitted packet and identified as a missing packet for adding to a second counter the retransmission count value contained within the respective retransmission count field; and means for generating a loss value indicative of a reception characteristic of said receiver as a function said first and second counters.

20. A method of operation at a receiver in a multicast data distribution group, said method comprising:

receiving at said receiver a plurality of multicast data packets of a multicast session, wherein each one of said packets includes a retransmission count within a retransmission count field, said retransmission count being indicative of the number of bytes contained in the the respective packet multiplied by the number of times the respective packet has been retransmitted;

in response to receipt of each one of said plurality of multicast data packets adding to a retransmission counter said retransmission count to produce a retransmission counter value in the event the respective received packet is a retransmitted packet and the respective received packet is identified within the receiver as a missing packet; and generating a loss value indicative of a reception characteristic of said receiver as a function of said retransmission counter value.

21. The method of claim 20 wherein said method further includes the step of adding to an original packet counter a value indicative of the number of bytes contained in each one of said plurality of received packets to produce an original packet counter value in response to receipt of each received packet that is first received as a result of a packet transmission from a sending node or as a result of a packet retransmission from a repair head and wherein said generating step comprises the step of generating said loss value as a function of said retransmission counter value and said original packet counter value.

22. The method of claim 21 wherein said step of generating said loss value comprises the step of dividing said retransmission counter value by said original packet counter value.

23. The method of claim 20 further comprising the step of dissociating said receiver from said multicast data distribution group in the event said loss value exceeds a specified threshold value.

24. The method of claim 20 further comprising the step of transmitting from said receiver a message indicative of congestion at said receiver in the event said loss value exceeds a specified threshold value.

\* \* \* \* \*